United States Patent [19]

Lauro

[11] Patent Number: 4,811,233

[45] Date of Patent: Mar. 7, 1989

[54] COST-OPTIMAL STATE FEEDBACK CONTROLLER FOR ALL-ATTITUDE GIMBAL SYSTEM

[75] Inventor: George L. Lauro, Dalton, Mass.

[73] Assignee: The United States of America as represented by the Secretary of the Navy, Washington, D.C.

[21] Appl. No.: 36,225

[22] Filed: Apr. 2, 1987

[51] Int. Cl.$^4$ .............................................. G01C 19/38
[52] U.S. Cl. ........................................ 364/453; 33/316; 33/324
[58] Field of Search ................... 364/443, 453; 33/316, 33/318, 321, 322, 323, 324; 318/520

[56] References Cited

U.S. PATENT DOCUMENTS

| | | | |
|---|---|---|---|
| 4,222,272 | 9/1980 | Mairson | 364/453 X |
| 4,318,300 | 3/1982 | Maughmer | 73/178 R |
| 4,379,365 | 4/1983 | Riethmüller et al. | 33/316 |
| 4,472,978 | 9/1984 | Levine et al. | 33/321 |
| 4,593,359 | 6/1986 | Sadeh | 364/443 |
| 4,603,483 | 8/1986 | Wing | 33/324 |
| 4,622,646 | 11/1986 | Waller et al. | 364/571 |
| 4,654,582 | 3/1987 | Ito | 324/73 R |
| 4,686,771 | 8/1987 | Beveventano et al. | 33/324 |

*Primary Examiner*—Michael R. Fleming
*Attorney, Agent, or Firm*—Arthur A. McGill; Prithvi C. Lall; Michael J. McGowan

[57] ABSTRACT

An improved cost-optimal state feedback control system for stabilizing the inertial reference platform in all-attitude inertial guidance systems which uses the "region" control concept. It reduces the computational requirements of cost-minimizing state feedback to within the capacity of aerospace vehicle onboard control processors. The control system iterates the feedback compensation process so as to reduce the R-gyro error to essentially a zero value and to prevent the gimbal assembly from entering a "gimbal lock" orientation.

3 Claims, 5 Drawing Sheets

COST-OPTIMAL STATE FEEDBACK CONTROLLER FOR ALL-ATTITUDE GIMBAL SYSTEM

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

This invention is related to cost-optimal state feedback control systems and more particularly to a "region" control system which regulates or stabilizes the inertial platform of a vehicle in motion and which has computational requirements within the capability of the vehicle onboard control processors.

(2) Statement of Prior Art

Vehicle inertial reference subsystems contain a gyro-stabilized platform which is instrumented with accelerometers that are used to sense the vehicle motion along three orthogonal axes. The vehicle guidance computer uses the data from these accelerometers to determine the vehicle position and the velocity vectors which in turn are used for computing the vehicle steering commands. The navigation problem is to determine the acceleration of the vehicle along axes that define a three dimensional space which is established prior to flight and is fixed during the entire flight. Therefore, the platform on which the accelerometers are mounted must be suspended in inertial space during the flight and must remain unperturbed by the vehicle motion. A mechanical assembly of four concentric gimbals is used to isolate the inertial platform from its environment. The innermost gimbal, or stable member (which is also known as elevation gimbal) houses the accelerometers and is held fixed in the inertial space by moving the other gimbals to counteract the vehicle motion.

A complex control system is required to generate the feedback to the torque motors that move the gimbals in such a way as to maintain the inertial integrity of the stable member. Several schemes have been developed which use classical control techniques to derive this feedback. State variable methods introduce a completely new approach which offer a more analytically appealing solution, increased design flexibility and improved performance. The function of an all-attitude gimbal assembly controller is twofold: (1) to stabilize the reference platform in inertial space, and (2) to prevent the gimbal assembly from assuming a gimbal lock geometry i.e., when all the gimbal axes are in the same plane.

Gyroscopes that are mounted on the inertial platform (stable member) of the gimbal assembly produce voltages proportional to the platform perturbation along their respective axes. Three orthogonal gyroscopic errors; the V-gyro, J-gyro and R-gyro errors; are generated from these voltages. Moving the gimbals to null the three orthogonal gyro errors isolates the stable member from vehicle motion. "Gimbal lock" refers to the undesirable situation in which all four gimbal axes are coplanar. When the gimbal assembly is in a lock configuration, there are vehicle motions that cannot be isolated from the inertial platform by torquing the gimbals, resulting in the loss of the inertial reference. As described above, optimal state variable methods introduce a completely new approach which offers a more analytically appealing solution, increased design flexibility and improved performance. Referring to block diagram, the system to be stabilized by the state variable method is a subsystem of the complete gimbal assembly. Specifically, in the absence of friction, the V-gyro and J-gyro errors are almost zero and the inner elevation gimbal torques are virtually isolated from the rest of the gimbal assembly. The small V-gyro and J-gyro disturbances that are produced by the intergimbal friction and less significant effects are corrected by closing simple single-input single-output servos around these errors.

The feedback torques to the middle and outer gimbals are computed using cost function minimizing (cost-optimal) state variable methods. The number of computations to be performed for the middle and outer gimbal state variable control is very large as the cost function minimizing optimal feedback matrix $\overline{F}_o$ must be generated by performing a large number of mathematical operations on the values of inner gimbal and middle gimbal angles, $A_i$ and $A_m$, respectively. Thus, there is a need for a cost-optimal state variable method which does not involve inordinate amount of computational requirements beyond the capability of vehicle onboard control processors.

SUMMARY OF THE INVENTION

An improved cost-optimal control system according to the teachings of subject invention includes an approach wherein a quadratic cost function is constructed from various controlled dynamic parameters of the gimbal assembly. A plane defined by the inner gimbal angle ($A_i$) and the middle gimbal angle ($A_m$) is divided into a number of regions wherein corresponding to a certain value of $A_i$ and $A_m$, a single valued state vector is defined. Corresponding to that state vector, an optimal control feedback vector $\overline{F}_o$ which minimizes the quadratic cost function is generated which represents the value of the vector for any point in that region. Using the $\overline{F}$ vector so obtained and the state vector obtained from the values of angle $A_i$, angle $A_m$, and $R_{gyro}$ and its derivatives and the related parameters thereof, values of $T_o$ (input torque for the outer gimbal) and $T_m$ (input torque for the middle gimbal) are obtained which are applicable to any value of angle $A_i$ and angle $A_m$ in that region. According to this technique the process is iterated until R-gyro error is nulled and either sine of $A_i$ or sine of $A_m$ is nulled which are the requirements for keeping the platform stable and keeping the gimbal assembly away from the gimbal lock position.

An object of subject invention is to have a region control system which provides nulling of the R-gyro error and thus stabilizing the stable platform of the gimbal assembly.

Another object of subject invention is to obtain a table of the $\overline{F}$ vectors computed off-line which can be used with the online data to generate the values of $T_O$ and $T_m$ which when applied will ultimately stabilize the platform and keep the gimbal assembly from a gimbal lock position.

Other objects, advantages and novel features of the invention will become apparent from the following detailed description of the invention when considered in conjunction with the accompanying drawings wherein:

DESCRIPTION OF A PREFERRED EMBODIMENT

Figure 1:
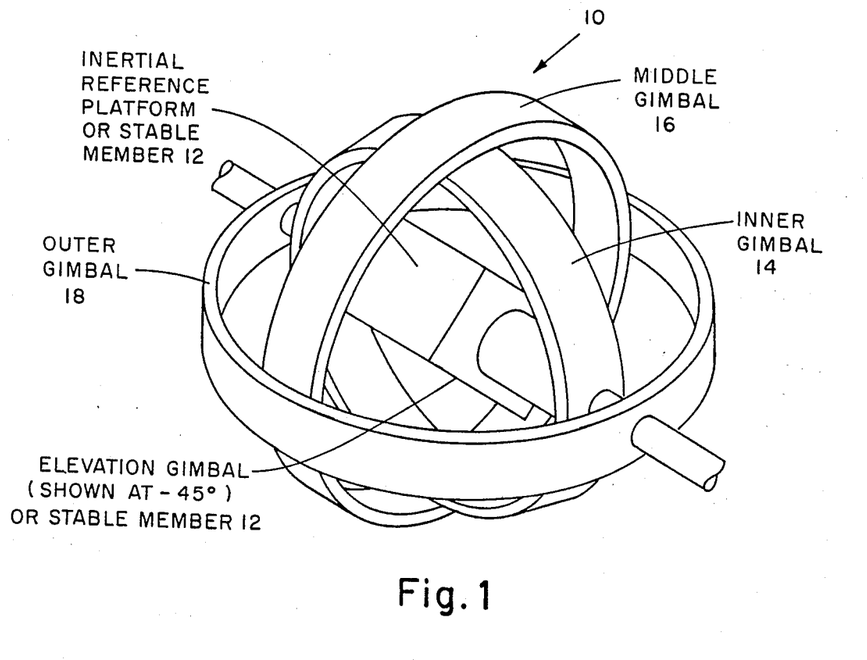
FIG. 1 is a schematic representation of a typical four gimbal assembly.

Referring to the drawings, FIG. 1 schematically shows an inertial measuring unit IMU 10 which includes inertial reference platform (stable member) or elevation gimbal 12, inner gimbal 14, middle gimbal 16 and outer gimbal 18 as pointed out earlier, when IMU 10 is mounted on a vehicle moving in space, our objective is to have a control system which moves the inner gimbal 14, middle gimbal 16 and outer gimbal 18 in such a was as to maintain the inertial integrity of the stable member 12. Several control schemes have been developed which use classical control methods to derive the control feedback to the motors that move gimbals 14, 16 and 18. All attempts to apply modern optimal state feedback techniques to the IMU 10 control problem have resulted in computationally impractical realizations. However, subject scheme takes advantage of the dependence of the optimal controller on the inner and middle IMU 10 gimbal angles ($A_i$ and $A_m$). It partitions the IM plane (i.e. $A_i$-$A_m$) into several regions of constant state feedback. For each region, a single state feedback matrix is calculated off line for all IMU 10 geometrics falling in that region and stored in the control process memory. At each sample instant the matrix for the current geometry is fetched from the memory and is multiplied by the state vector, dependent upon the IMU 10 geometry, for the control feedback. By computing the control matrices off-line, the bulk of the optimal control calculation is averted. This aspect is shown diagrammatically in FIG. 2 wherein Optimal State Feedback (OSF) controller 20 has its outputs 26 ($T_m$) and 28 ($T_o$) to the IMU 10 and its inputs 30 [$\hat{X}(i)$-state vector] and 32 [$\bar{F}_o$, the optimal state feedback matrix]. J-& V-gyro classical controller provide the IMU very small torques $T_e$ (22) and $T_i$ (24) which depend upon the friction between the members of the IMU 10. The outputs 26 ($T_m$) and 28 ($T_o$) of the OSF (Optimal State Feedback) controller 20 changes the geometry of the IMU 10 so as to null $R_{gyro}$ and also null either elevation gimbal angle ($A_e$) or inner gimbal ($A_i$). This keeps the IMU 10 stable by nulling $R_{gyro}$ and keep the IMU away from gimbal lock by making either $A_i$ or $A_e$ to be zero.

Figure 3:
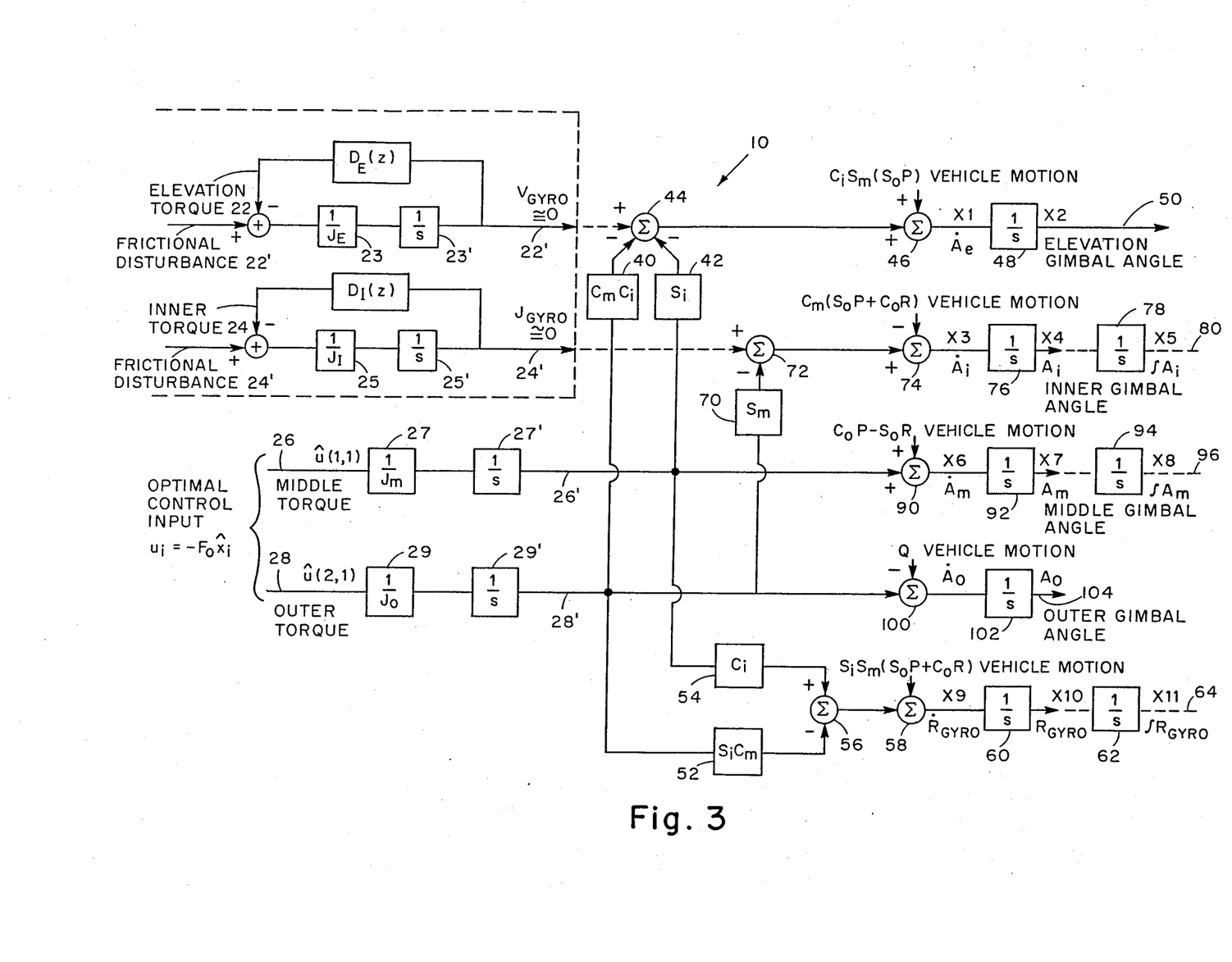
FIG. 3 is a block diagram illustrating the relationship among the gimbal torques and the various gimbal angles and gyroscopic errors of the gimbal assembly.
Figure 4:
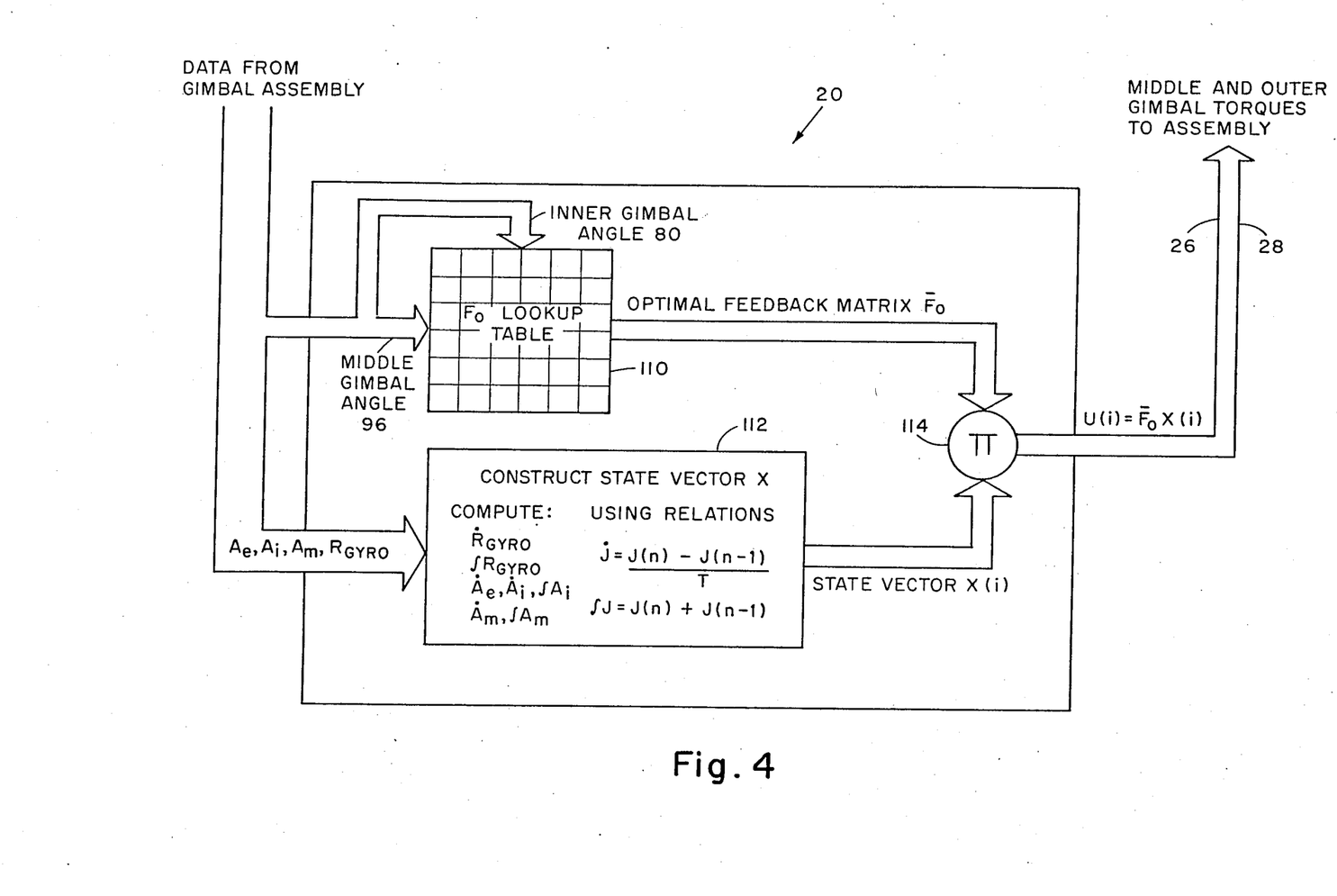
FIG. 4 is a block diagram of a region control system and the various inputs and outputs thereto and therefrom.

Before describing subject technique in detail as shown in FIGS. 3 and 4, it is instructive to briefly describe the underlying basic concepts of control theory from a book such as *Linear Optimal Control Systems* by Kwakernaak & Sivan, Wiley-Interscience (1972) which is incorporated herein by reference. The outputs of the integrating elements are chosen to be the system state variables while the middle and outer gimbal torques ($T_m$ and $T_o$) are the system input variables.

The system state vector vector $\hat{X}(t)$ is defined as:

$$\hat{X}(t) = [\dot{A}_e, A_e, \dot{A}_i, A_i, \int A_i, \dot{A}_m, A_m, \int A_m, \dot{R}_{gyro}, R_{gyro}, \int R_{gyro}]^T \quad (1)$$

and the system input vector $\hat{U}(t)$ as defined as:

$$\hat{U}(t) = [T_m, T_o]^T \quad (2)$$

$\hat{X}(t)$ and $\hat{U}(t)$ are written as the transpose of the matrices shown on the right hand side of equations (1) and (2), respectively, to only one row for each instead of only one column for each.

It is to be noted that the IMU 10 geometries near $A_i = A_m = 0$, the outer gimbal torque ($T_o$) input is orthogonal to the middle inner gimbal axes and $T_o$ has no states to control. Thus the first parameters are $x_1(t) = \dot{A}_e(t)$ and $x_2(t) = A_e(t)$. In order to prevent gimbal lock, $A_i$ is nulled to either 0 of 180 degrees. Controlling the additional states, $A_i(t)$ and $\int A_i(t)$, allow for fine control of the closed-loop system dynamics and thus $x_3(t) = \dot{A}_i(t); x_4(t) = A_i(t)$ and $x_5(t) = \int A_i(t)$. Furthermore, for some IMU 10 or gimbal assembly geometries, gimbal lock is prevented by controlling the middle gimbal angle, $A_m$, instead of inner gimbal angle, $A_i$. Thus we have $x_6(t) = \dot{A}_m(t), x_7(t) = A_m(t)$ and $x_8(t) = \int A_m(t)$. Besides, $R_{gyro}$ error is nulled for inertial platform stabilization and states $\dot{R}_{gyro}$ and $\int R_{gyro}$ are also controlled to enhance closed-loop performance and to eliminate steady-state D.C. errors. Therefore, $x_9(t) = \dot{R}_{gyro}(t); x_{10}(t) = R_{gyro}$ and $x_{11}(t) = \int R_{gyro}(t)$. Thus $x_1, -x_{11}$ states are used to define the system state vector $\hat{X}(t)$.

One of the basic theorems in control theory is that the time derivative of the system state vector is equal to a matrix multiplied by the system state vector plus another matrix multiplied by the system input vector. Thus, Thus, $$\dot{\hat{X}}(t) = A \cdot \hat{X}(t) + B \cdot \hat{U}(t) \quad (3)$$

where $\hat{X}(t)$ is the system state vector $\hat{U}(t)$ is the system input vector, and the matrices A and B define the dynamics of the system.

For the gimbal assembly, the state differential is obtained by inspection of FIG. 3 which is $$\dot{X}(t) = \begin{bmatrix} 00000000000 \\ 10000000000 \\ 00000000000 \\ 00100000000 \\ 00010000000 \\ 00000000000 \\ 00001000000 \\ 00000100000 \\ 00000000000 \\ 00000000010 \\ 00000000000 \end{bmatrix} \hat{X}(t) + \begin{bmatrix} Si/Jm & CmCi/Jo \\ 0 & 0 \\ 0 & Sm/Jo \\ 0 & 0 \\ 0 & 0 \\ 1/Jm & 0 \\ 0 & 0 \\ 0 & 0 \\ Ci/Jm & -SiCm/Jo \\ 0 & 0 \\ 0 & 0 \end{bmatrix} \hat{U}(t) \quad (4)$$

$A$      $B$

The system state variables are sampled and the control algorithm is performed at 100 Hz. The resulting discretized system is then described by the state difference equation $$\hat{X}(i+1) = A_d \cdot \hat{X}(i) + B_d \cdot \hat{U}(i) \quad (5)$$

which relates the ith sample of the system state to the (i+1)th sample. The $A_d$ and $B_d$ matrices are derived from A and B matrices of the continuous system state differential equation (4).

$$A_d = e^{AT} = I + AT + \frac{(AT)^2}{2!} + \frac{(AT)^3}{3!} + \ldots \quad (6)$$

and
$$B_d = T \cdot A_d \cdot B$$

where T is the sampling interval = 1/100 second if the control algorithm is performed at 100 Hz.

The state difference equation of the sample-data gimbal assembly is:

$$X(i+1) = \quad (7)$$

$$\begin{bmatrix} 10000000000 \\ T100000000 \\ 00100000000 \\ 00T10000000 \\ 000T1000000 \\ 00000100000 \\ 00000T10000 \\ 000000T1000 \\ 00000000100 \\ 00000000T10 \\ 0000000001 \end{bmatrix} X(i) + \begin{bmatrix} Si/Jm & CmCi/Jo \\ TSi/Jm & TCmCi/Jo \\ 0 & Sm/Jo \\ 0 & TSm/Jo \\ 0 & 0 \\ 1/Jm & 0 \\ T/Jm & 0 \\ 0 & 0 \\ Ci/Jm & -CmCi/Jo \\ -TCi/Jm & -TCmCi/Jo \\ 0 & 0 \end{bmatrix} U(i)$$

$A_d$      $B_d$

For an optimal regulator, state variables that are regulated by the controller, called the Controlled Variables of the system, are the elements of a vector $\hat{Y}$ which is a subset of state vector $\hat{X}$.

$$\hat{Y}(i) = C_d \cdot \hat{X}(i) \quad (8)$$

Consider a performance index C which is the accumulation of the weighted values of the controlled variables and of the system inputs during the control interval which is given by:

$$C = \sum_{i=0}^{\infty} [\hat{Y}^T(i) \cdot R_3 \cdot \hat{Y}(i) + \hat{U}^T(i) \cdot R_2 \cdot \hat{U}(i)] \quad (9)$$

where:
$\hat{Y}(i)$ = Vector of controlled variables;
$\hat{U}(i)$ = System input vector;
$\hat{X}(i)$ = System state vector;
$R_2$ = Input weighting matrix;
$R_3$ = Controlled variable weighting matrix.

Matrices $R_2$ and $R_3$ are real and symmetric The cost Optimal regulator defines a unique system input, $\hat{U}(i) = -\overline{F}_o \cdot \hat{X}(i)$, that will drive the gimbal assembly from any initial state to the Zero State (all controlled variables=0) in such a way as to minimize the index (9). The optimal state feedback for the ith sample interval, F(i), can be computed by solving the algebraic-Riccati Equation (10).

$$P(i) = A_d^T [R_1 + P(i+1)][A_d - B_d F(i)] \quad (10)$$

where the ith optimal feedback matrix is:

$$\overline{F}(i) = [R_2 + B_d^T (R_1 + P(i+1))B_d]^{-1} \cdot B_d^T [R_1 + P(i+1)] A_d \quad (11)$$

and
$$R_1 = C_d^T \cdot R_3 \cdot C_d$$

Since Rank$[B_d, A_d B_d, \ldots, \ldots A_d^{11} B_d] = 11$, the sample-data system is completely controllable and a steady-state optimal feedback matrix, $F_o$, exists which can be computed by iterative application of equations (10) and (11). For a sufficiently large number of iterations, $\overline{F}(i)$ converges to the steady-state optimal state feedback matrix $\overline{F}_o$.

For defining the weighting matrix, it is to be noted that the gimbal assembly control task is to null $R_{gyro}$ and also null either the sine of the inner gimbal angle or the sine of the middle gimbal angle. Therefore, two control vectors are defined.

Case 1: Regulating $R_{gyro}$ and the sine of the inner gimbal angle:

Sin $(A_i) \approx A_i$ and $$\hat{Y}(i) = [\dot{A}_e, \dot{A}_i, A_i, \int A_i, \dot{R}_{gyro}, R_{gyro}, \int R_{gyro}]^T \quad (12)$$

Case 2: Regulating $R_{gyro}$ and the sine of the middle gimbal angle.

Sin $(A_m) \approx A_m$ and $$\hat{Y}(i) = [\dot{A}_e, \dot{A}_m, A_m, \int A_m, \dot{R}_{gyro}, R_{gyro}, \int R_{gyro}]^T \quad (13)$$

Only the maximum values of the controlled state variables and inputs are penalized in this regulator. Therefore, penalty matrices $R_2$ and $R_3$ are diagonal and their respective elements are selected so that the coefficient of each state product in index (8) is the reciprocal of the maximum value that the product is allowed to attain during closed loop operation.

For Case 1:

$$R_3 = \begin{bmatrix} (\dot{A}e\text{max})^{-2} & 0 & 0 & 0 & 0 & 0 & 0 \\ 0 & (\dot{A}i\text{max})^{-2} & 0 & 0 & 0 & 0 & 0 \\ 0 & 0 & (Ai\text{max})^{-2} & 0 & 0 & 0 & 0 \\ 0 & 0 & 0 & (\int Ai\text{max})^{-2} & 0 & 0 & 0 \\ 0 & 0 & 0 & 0 & (\dot{R}\text{max})^{-2} & 0 & 0 \\ 0 & 0 & 0 & 0 & 0 & (R\text{max})^{-2} & 0 \\ 0 & 0 & 0 & 0 & 0 & 0 & (\int R\text{max})^{-2} \end{bmatrix} \quad (14)$$

For Case 2:

$$R_3 = \begin{bmatrix} (\dot{A}e\text{max})^{-2} & 0 & 0 & 0 & 0 & 0 & 0 \\ 0 & (\dot{A}m\text{max})^{-2} & 0 & 0 & 0 & 0 & 0 \\ 0 & 0 & (Am\text{max})^{-2} & 0 & 0 & 0 & 0 \\ 0 & 0 & 0 & (\int Am\text{max})^{-2} & 0 & 0 & 0 \\ 0 & 0 & 0 & 0 & (\dot{R}\text{max})^{-2} & 0 & 0 \\ 0 & 0 & 0 & 0 & 0 & (R\text{max})^{-2} & 0 \\ 0 & 0 & 0 & 0 & 0 & 0 & (\int R\text{max})^{-2} \end{bmatrix} \quad (15)$$

and in both cases $$R_2 = \begin{bmatrix} Tm\text{max} & 0 \\ 0 & To\text{max} \end{bmatrix} \quad (16)$$

For Computer Simulation the gimbal assembly transfer characteristics and hence steady-state optimal feedback matrix change with intergimbal motion. This effect manifests itself in the $B_d$ matrix of equation (7), many elements of which are functions of the inner gimbal (Ai) and/or the middle gimbal angle (Am).

A basic program is written that computes the steady-state solution to the Riccati Equation (10) and the corresponding optimal feedback matrix for any gimbal assembly geometry using any performance index that yields a convergent solution. This program has been incorporated into a computer simulation of the gimbal assembly which has provisions for vehicle motion along the three axes.

Since the $B_d$ matrix is a function of inner and middle gimbal geometry, there is a unique steady-state optimal feedback matrix for each of the infinite number of possible gimbal orientations. In an actual application, it is not possible to recalculate the optimal solution for the gimbal geometry at each sample instant because the computational requirements far exceed the capacity of the vehicle control processor.

A solution is to partition all possible inner-middle gimbal orientations into several "regions", each region having its own unique $\overline{F}_o$ matrix. The $\overline{F}_o$ matrix for the center of each region is calculated or precomputed on a main frame computer and stored in a ROM look-up table. At each sample interval the processor uses angular data from the gimbal assembly to determine which region it is in, then it fetches the $\overline{F}_o$ matrix elements for that region from ROM and performs the multiplications and additions for the control feedback. Using this method, the real-time computational requirements of the control algorithm are effectively reduced by several orders of magnitude.

FIG. 3 is a block diagram of the inputs and outputs to the IMU 10 including a number of integrators, summers and resolvers used in the figure. In essence, FIG. 3 is a pictorial representation of the mechanics of the gimbal assembly 10 of FIG. 1. This is a modified version of the one developed by Louis Martinage at the Charles Stark Draper Laboratory in Cambridge, MA. The portion of the block diagram within the dashed lines can be treated in a conventional fashion as the errors involved in that section are as a result of very small friction between various members of the IMU 10 and are less significant effects which are corrected by closing single input-single output servos around these errors as shown in FIG. 3 involving elevation torque 22, frictional disturbance 22', multiplier 23, integrator 23' and feedback unit $D_E(z)$, inner torque 24, frictional disturbance 24', multiplier 25, integrator 25'. The remaining torques, $T_m$ (middle gimbal torque) 26 and $T_o$ (outer gimbal torque) 28 represent the optimal control input and they affect all or some of the eleven parameters depending upon the geometry of the gimbal assembly. $S_i$, $C_i$, are sine and cosine of the inner angle $A_i$; $S_m$, $C_m$, sine and cosine of middle angle $A_m$; $S_o$, $C_o$, sine and cosine of the outer angle $A_o$; the pitch angular velocity (P), the roll angular velocity (R) and the yaw angular velocity (Q). Various summers, integrators and multipliers are shown in the figure so as to generate various parameters as shown.

Figure 2:
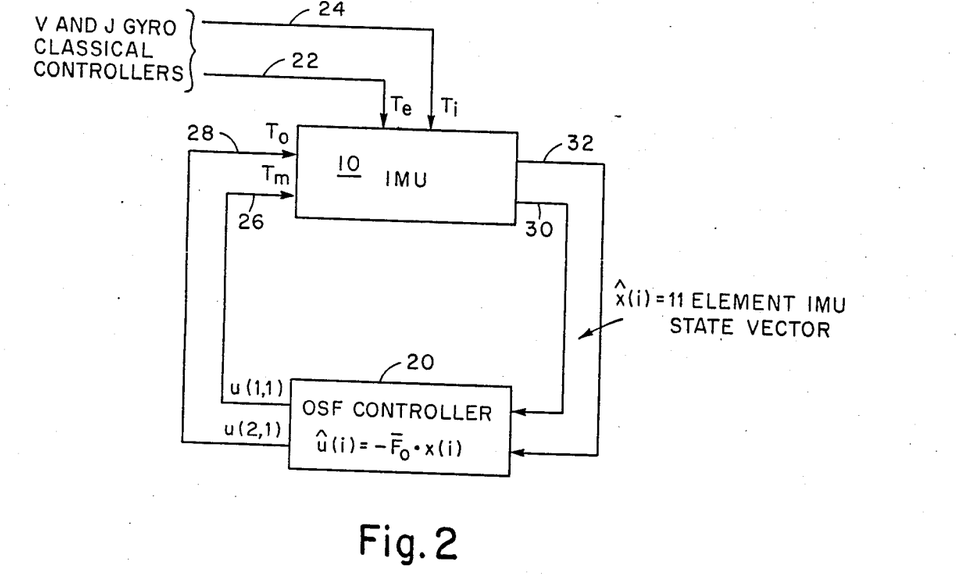
FIG. 2 is a block diagram of the controller system in conjunction with the IMU assembly and the various feedbacks from one another.
Figure 5:
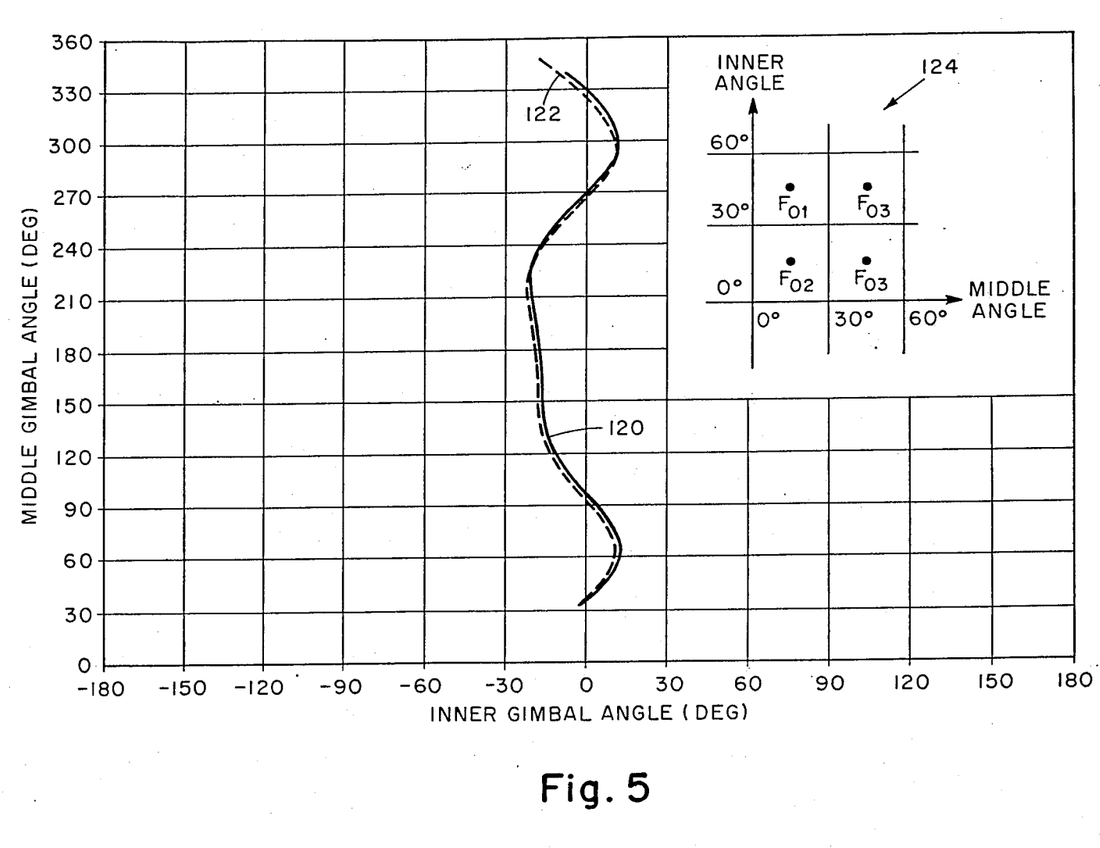
FIG. 5 is a graphical representation showing the respective results for middle gimbal angle using a classical and a region controller system according to the teachings of subject invention.
Figure 6:
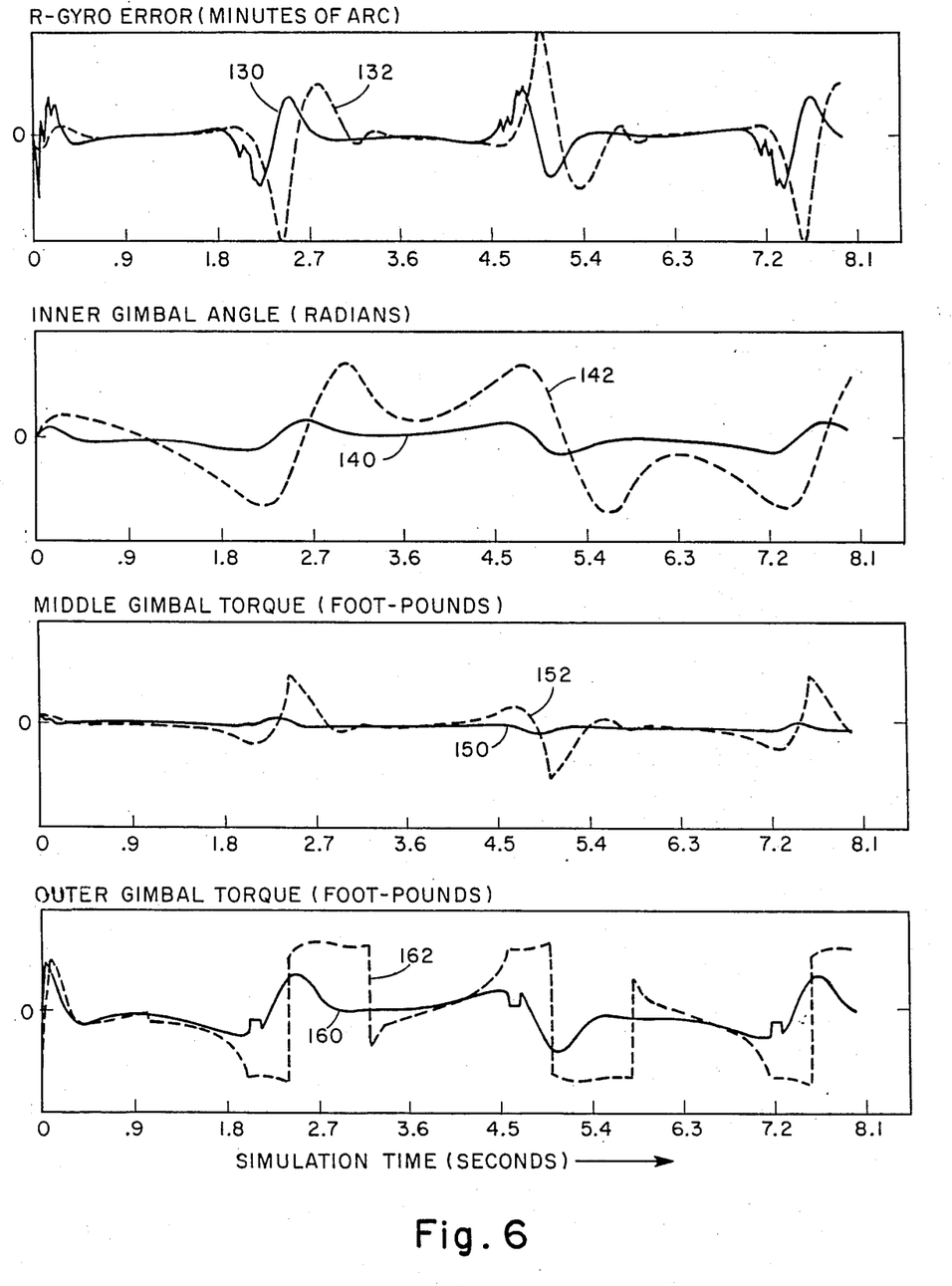
FIG. 6 is a representation of the various parameters such as R-gyro errors, inner gimbal angle, middle gimbal torque, outer gimbal torque based upon the classical state vector approach and the improved region controller according to the teachings of subject invention.

FIG. 4 is a block diagram of the inputs and outputs of the Optimal State Feedback (OSF) Controller 20 or the guidance computer of FIG. 2. Data from IMU 10 or gimbal assembly 10 in the Form $A_e, A_i, A_m, R_{gyro}$ representing the geometry of the gimbal assembly is fed to OSF controller 20 wherein the information about $A_i(80)$ and $A_m(96)$ goes to block 110 to select appropriate value of the optimal feedback matrix $\overline{F}_o$ from the $\overline{F}_o$ lookup table in block 10 which is stored there as a result of off-line or precomputed computations for various values of $A_i$ and $A_m$ using the discrete regions approach as mentioned earlier and thus each region in the $A_i$-$A_m$ plane is represented by a single value of $\overline{F}_o$. The data from the gimbal assembly 10 in the form of $A_e, A_i, A_m, R_{gyro}$ is also fed to block 112 where $R_{gyro}, R_{gyro}, A_e, A_i, A_i, A_m$ and $A_m$ are computed and a state vector $X$ is constructed based upon the 11 parameters ($A_e, A_e, A_i, A_i, \int A_i, A_m, A_m, \int A_m, R_{gyro}, R_{gyro}$ and $\int R_{gyro}$). The state vector X and optimal feedback matrix $\overline{F}_o$ are multiplied in block 114 to obtain $\hat{U}(i)$ which provides $T_m(26)$ and $T_o(28)$ as inputs to the gimbal assembly 10. The system goes through the necessary iterations so as to null $R_{gyro}$ and null either $A_i$ or $A_m$. FIG. 5 shows the results of $A_i, A_m$ calculations using the discrete regions approach of subject invention is represented by the dashed curve 122 to compare with the solid curve 120 obtained without using the discrete region approach. FIG. 5 also shows at the right hand top thereof representation 124 of $A_i$-$A_m$ plane with a single value $\overline{F}_o$ matrix for each of the regions shown. FIG. 6 also compares the results obtained for $R_{gyro}$ error, inner gimbal angle, middle gimbal torque, and outer gimbal torque shown by respective solid curves 130, 140, 150 and 160 using the discrete region approach of subject invention with the corresponding dashed curves 132, 142, 152 and 162 obtained without the discrete region approach for $A_i$-$A_m$ plane. As can be seen from FIGS. 5 and 6, the results are in excellent agreement. Thus the discrete regions approach for the $A_i$-$A_m$ plane according to the teachings of subject invention simplifies the problem of stabilizing the IMU 10 during the motion of a vehicle to a manageable level.

Briefly stated, the discrete regions for the $A_i$-$A_m$ plane for stabilizing an IMU for a vehicle moving in space according to the teachings of subject invention entails subdividing the $A_i$-$A_m$ plane into a number of discrete regions and computing off-line a single value optimal feedback matrix for each discrete region using a general purpose computer and storing the information so obtained in the form of a $\overline{F}_o$ lookup table. Information with regard to a sample state of the IMU 10 including $A_i$, $A_m$, $A_e$, $R_{gyro}$ is also used to construct a state vector function for each of the discrete regions. The values of the optimal feedback matrix and the state vector for a particular discrete region are then multiplied to obtain $T_m$ and $T_o$ to be applied to the gimbal assembly to stabilize it and also prevent gimbal lock thereof after the necessary iterations for the feedback compensation process. The gimbal assembly system is finally stabilized in a non-gimbal lock configuration after the necessary iterations.

Obviously many modifications and variations of the present invention may become apparent in the light of the above teachings. As an example, the number of regions into which the $A_i$-$A_m$ plane can be divided can be changed. Furthermore, the optimal state vector can be formed using more parameters in order to improve the accuracy of the system. The various hardware components can be replaced by their equivalents without deviations of the subject invention.

It is therefore understood that within the scope of the appended claims the invention may be practiced otherwise than as specifically described.

What is claimed is:

1. A method for stabilizing an inertial reference platform as stable member of a four gimbal assembly mounted on a moving vehicle by means of a computing and information storing means used as an optional feedback controller, said method including the steps of:
   dividing a plane defined by values of inner gimbal angle $A_i$ and middle gimbal angle $A_m$ into a plurality of regions;
   constructing a single valued feedback matrix for all values of $A_i$ and $A_m$ for every region of said plurality of regions;
   precomputing the value of said single valued feedback matrix for each of said plurality of regions;
   storing said precomputed values of said single valued feedback matrix for different regions of said plurality of regions in said computing and storing means in the form of a look-up table;
   constructing a state vector for each geometry of said gimbal assembly;
   multiplying the value of said single valued matrix for a particular region of said plurality of regions with the corresponding state vector to obtain a function giving values of outer gimbal torque ($T_o$) and middle gimbal torque ($T_m$) to be applied to the outer gimbal and the middle gimbal respectively to produce a new geometry of said gimbal system with iterated values of $A_i$ and $A_m$;
   using said iterated values of $A_i$ and $A_m$ to read off the optimum value of the single valued feedback matrix; and
   iterating computations using said iterated $A_i$ and $A_m$ until said gimbal assembly is stabilized in a non-gimbal lock configuration.

2. The process of claim 1 wherein said vector is constructed using $\dot{A}_e, A_e, \dot{A}_i, A_i, \int A_i, A_m, A_m, \int A_m, \int \dot{R}_{gyro}, R_{gyro}$ and $R_{gyro}$ as parameters wherein $A_e$ is elevation gimbal angle and $R_{gyro}$ represents voltage signal developed representing $R_{gyro}$ error.

3. The process of claim 2 wherein the step of precomputing the value of single valued feedback matrix for each region of said plurality of regions includes using said precomputed values stored in main frame computer.

* * * * *